United States Patent [19]

Kikuchi et al.

[11] 4,451,195
[45] May 29, 1984

[54] ARM FOR A PROGRAM CONTROLLED MANIPULATOR

[75] Inventors: Akira Kikuchi, Kawasaki; Susumu Sawano, Koganei; Yoshimasa Ito, Yokohama, all of Japan

[73] Assignee: Tokico Ltd., Kanagawa, Japan

[21] Appl. No.: 387,747

[22] Filed: Jun. 11, 1982

[30] Foreign Application Priority Data

Jun. 15, 1981 [JP] Japan .................................. 56-91936

[51] Int. Cl.³ .............................................. B25J 9/00
[52] U.S. Cl. .................................. 414/732; 414/738; 414/4; 414/7
[58] Field of Search ............... 414/730, 732, 735, 738, 414/1, 4, 7

[56] References Cited

U.S. PATENT DOCUMENTS 4,107,948 8/1978 Molaug ..................................... 64/2
4,378,959 4/1983 Sushjara ............................... 414/732

FOREIGN PATENT DOCUMENTS 2378612 8/1978 France .
WO82/01681 5/1982 World Intel. Prop. Org. .... 414/730

Primary Examiner—Robert J. Spar
Assistant Examiner—Terrance L. Siemens
Attorney, Agent, or Firm—Cushman, Darby & Cushman

[57] ABSTRACT

A flexible arm for a program controlled manipulator, with a hydraulic rotary actuator supported on an inflexible arm, a first arm member secured to a rotary shaft of the actuator, a second arm member connected swingably to the first arm member by way of a shaft, a third arm member connected rotatably to the second arm member, a link member connected rotatably to the first and third arm member, and a working tool mounted to the free end of the flexible arm.

7 Claims, 4 Drawing Figures

ARM FOR A PROGRAM CONTROLLED MANIPULATOR

The present invention concerns an arm for use with an industrial robot or program controlled manipulator.

In a program controlled manipulator of a type having a support post rotatably mounted to a base member, an inflexible arm rotatable or swingeably provided to one end of the support post and a working tool, for instance, a paint spray nozzle attached at the top end of the arm, and adapted to automatically set the paint spray nozzle at optional positions for coating work pieces by the rotation of the support post and the swinging movement of the arm, it is rather difficult to set the paint spray nozzle at the optional positions since the arm used in the manipulator of this type is not generally bendable. Accordingly, the manipulator having such an arm can be applied only to the working for articles of simple configuration and is not very versatile.

While various types of bendable or flexible arm assemblies have been proposed recently for use with manipulators, they are not satisfactory, besides their complicated structure, in that it is difficult to set the paint spray nozzle to desired positions since the arm assembly is distorted due to its own weight if it is made relatively longer. In order to cope with such a problem, highly rigid material has to be used which is, however, not practical.

Further, since each of the arm members in the conventional flexible arm assembly for use with the manipulator is rotatably connected to each other at an equal interval, the load exerted on each of the shaft portions for rotatably connecting each of the arm members is much greater on the side of the support base than on the side of the free end and it is necessary to use material of relatively high mechanical strength for the shaft portion on the support side.

An object of this invention is to provide an arm for use with a manipulator in which each of the shaft portions situated from the support side to the free end side can be made of members having substantially equal mechanical strength.

Another object of the present invention is to provide a relatively long and bendable or flexible arm for use with a manipulator capable of reducing the distortion or deformation due to its own weight and setting its top end accurately to any predetermined position.

A further object of this invention is to provide an arm for use with a manipulator having excellent versatility and thus being capable of being applied to the working of word pieces with complicated configuration.

In accordance with the present invention, there is provided an arm for use with a manipulator comprising a first arm member supported on a support means, a second arm member rotatably connected at one end thereof to the first arm member, a third arm member rotatably connected to the second arm member, a fourth arm member rotatably connected to the third arm member, a first link member connected at one end thereof to the first arm member and at the other end thereof to one end of the third arm member respectively, and a second link member connected at one end thereof to the other end of the second arm member and at the other end thereof to one end of the fourth arm member respectively, the distance between the rotational center for the second arm member relative to the first arm member and the rotational center for the third arm member relative to the second arm member being made greater than the distance between the rotational center for the third arm member relative to the second arm member and the rotational center for the fourth arm member relative to the third arm member.

The present invention will be described more in detail by way of its preferred embodiment in conjunction with the appended drawings, by which the foregoing and other objects, as well as the features of the present invention will become more clear. However, the present invention is no way limited only to the embodiment specified below but include various other modifications and changes made by those skilled in the art.

Figure 1:
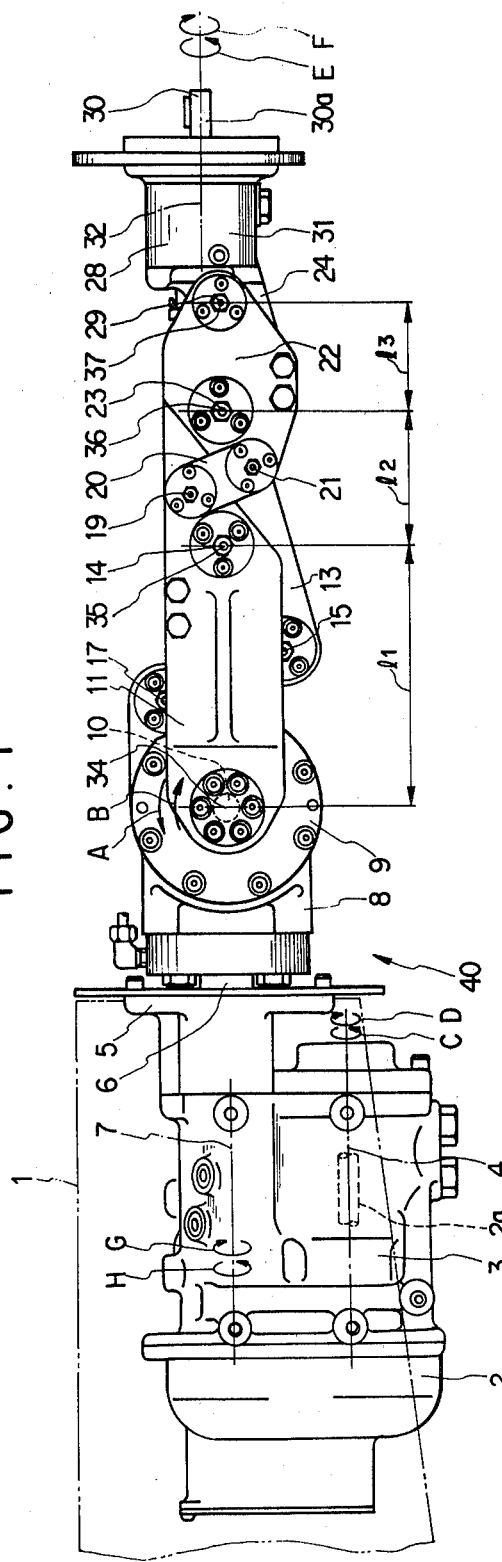
FIG. 1 is a side view of a preferred embodiment according to the present invention.
Figure 2:
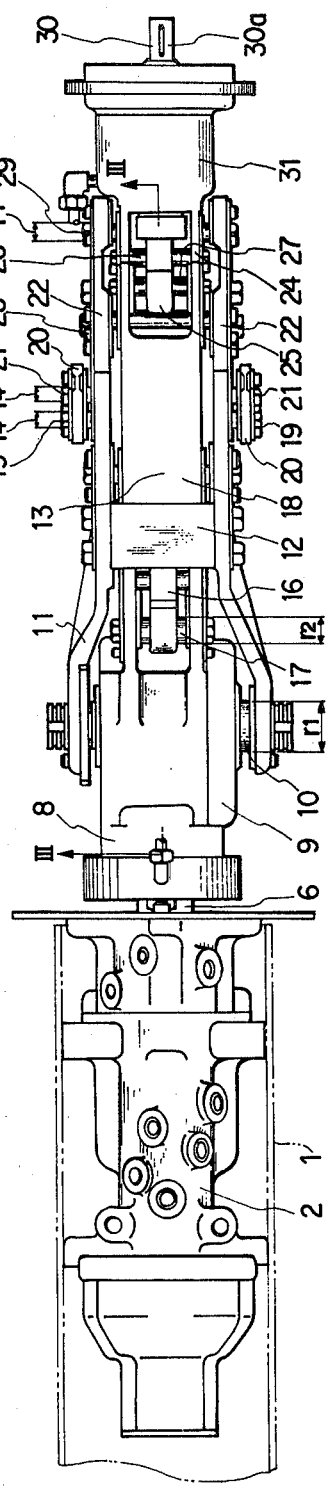
FIG. 2 is a plan view for the embodiment shown in FIG. 1.
Figure 3:
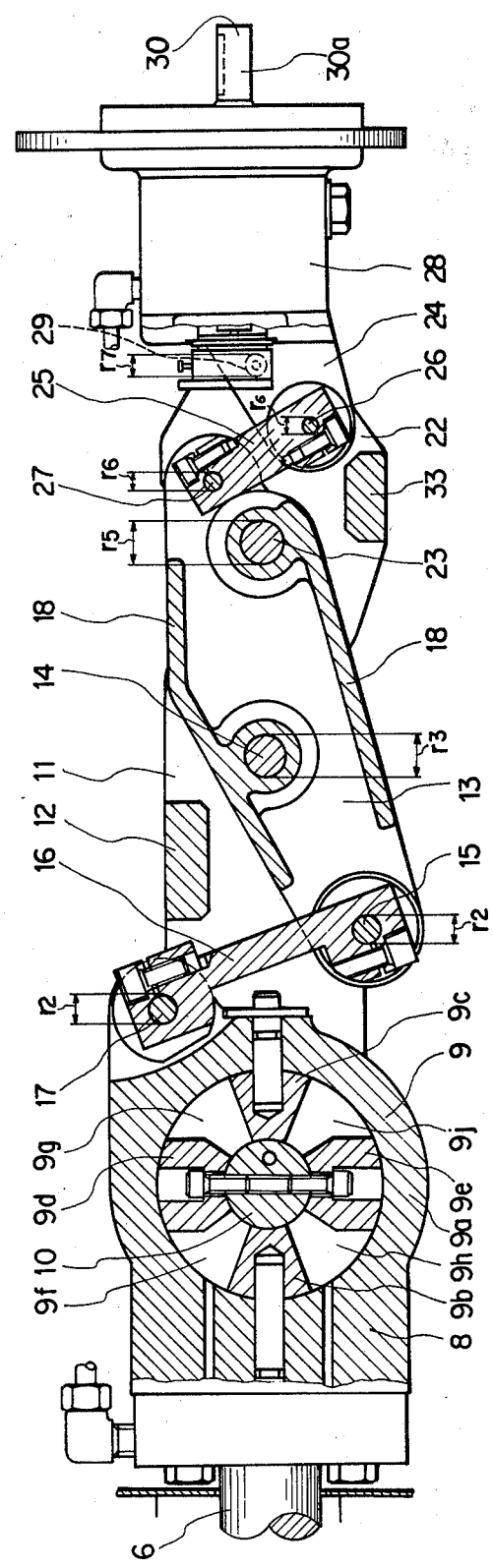
FIG. 3 is a sectional view taken along line III—III shown in FIG. 2.

In the drawing, an inflexible arm 1 for a manipulator is provided with a hydraulic rotary actuator 2 as support means, which is the same type as an actuator 9 to be explained later, and the rotational shaft 2a for the actuator 2 disposed within casing 3 of the actuator 2 and corresponding to the rotational shaft 10 of the actuator 9 is adapted to rotate in the direction C or D around an axial line 4. A rotational shaft 6 rotatably mounted within the casing 3 and projected out of one end 5 of the casing 3 is connected with the rotational shaft 2a for the actuator 2 by way of gears provided in the casing 3. When the rotational shaft 2a for the actuator 2 is rotated in the direction C or D by the hydraulic pressure, the rotational shaft 6 is also rotated in the direction G or H around an axial line 7. The gear ratio in the gears connecting the rotational shaft 2a for the actuator 2 with the rotational shaft 6 is set such that the rotational shaft 6 can be rotated by an angle of 360° corresponding to the maximum rotational amount of the rotational shaft 2a for the actuator 2. An arm member 8 is supported to the rotational shaft 6 and provided with a rotary actuator 9 of the same type as the actuator 2. The actuator 9 comprises partitioning members 9b and 9c fixed to a casing 9a of the actuator 9 and partitioning members 9d and 9e fixed to a rotational shaft 10, which is secured to a pair of opposing arm members 11. When hydraulic fluid under pressure is charged to and discharged from chambers 9f, 9g, 9h and 9j defined by the fixed partitioning members 9b and 9c and the movable partitioning members 9d and 9e, to rotate the rotational shaft 10 in the direction A or B, the arm members 11 are also rotated in the same direction A or B. In this way, the arm members 11 are rotatably connected by way of the rotational shaft 10 to the arm member 8. The arm members 11 are connected to each other by way of a plate member 12. An arm member 13 is connected about at the middle portion thereof rotatably by way of a shaft 14 to the arm members 11, and one end of the arm member 13 on the side of the arm member 8 is connected rotatably by way of a shaft 15 to one end of a link member 16. The other end of the link member 16 is connected rotatably by way of a shaft 17 to one end of the arm member 8. A pair of side plates of the arm member 13 is connected rigidly to each other by way of paired extensions 18.

Each one end of the arm members 11 is connected rotatably to each one end of link members 20 respectively by way of a shaft 19 and each of the other ends of the paired link members 20 is connected rotatably by way of a shaft 21 to each one end of arm members 22 on the side of the arm member 8. A pair of opposing arm members 22 are connected rotatably at the middle portion thereof by way of a shaft 23 to the arm member 13. Each one end of a pair of opposing arm members 24 on the side of the arm member 8 is connected rotatably by way of a shaft 26 to one end of a link member 25, and the other end of the link member 25 is connected rotatably by way of a shaft 27 to the other end of the arm member 13. The arm members 24 are provided with a hydraulic rotary actuator 28 of the same type as an actuator 2. The arm members 24 are connected rotatably by way of a shaft 29 to the arm members 22. A rotational shaft 30 for the actuator 28 secured to the arm members 24 is projected out of one end face of a casing 31 for the actuator 28 and, when the actuator 28 is operated by hydraulic pressure, the rotational shaft 30 is rotated in the direction E or F around an axial line 32. A pair of arm members 22 are connected rigidly to each other by way of a plate member 33. A working tool, for example, a paint spray nozzle is attached to the externally projected end portion 30a of the rotational shaft 30. Each of the arm members 8, 11, 13, 22 and 24, as well as each of the link members 16, 20 and 25 are constituted such that distance $l_1$ between an axial center 34 for the rotational shaft 10 and an axial center 35 for the shaft 14, distance $l_2$ between the axial center 35 and an axial center 36 for the shaft 23 and distance $l_3$ between the axial center 36 and an axial center 37 for the shaft 29 are made different from each other, with the distance $l_2$ being shorter than the distance $l_1$ and the distance $l_3$ being shorter than the distance $l_2$. It may also be constituted such that diameter $r_1$ for the rotational shaft 10, diameter $r_2$ for the shafts 15 and 17, diameter $r_3$ for the shaft 14, diameter $r_4$ for the shafts 19 and 21, diameter $r_5$ for the shaft 23, diameter $r_6$ for the shafts 26 and 27 and diameter $r_7$ for the shaft 29 are different from each other in such a way that the diameter for the shaft nearer to the side of the arm member 8 is made greater, so as to constitute an arm 40 as a tapered configuration. In this case, second moment of area $D_1$ of the arm member 8, the second moment of area $D_2$ of the arm member 11, the second moment of the area $D_3$ of the arm member 13, the second moment of area $D_4$ of the arm member 22 and the second moment of area $D_5$ of the arm member 24 relative to an axial line connecting the axial centers 34 and 37 are made different from each other, and they are increased generally toward the side of the arm member 8.

The flexible arm 40 for use with a manipulator having thus been constituted operates as below. When the actuator 2 is actuated to rotate the rotational shaft 6 around the axial line 7, the arm 40 itself is rotated around the axial line 7 to thereby rotate the paint spray nozzle (not shown) attached to the shaft 30 around the axial line 7 as well.

Figure 4:
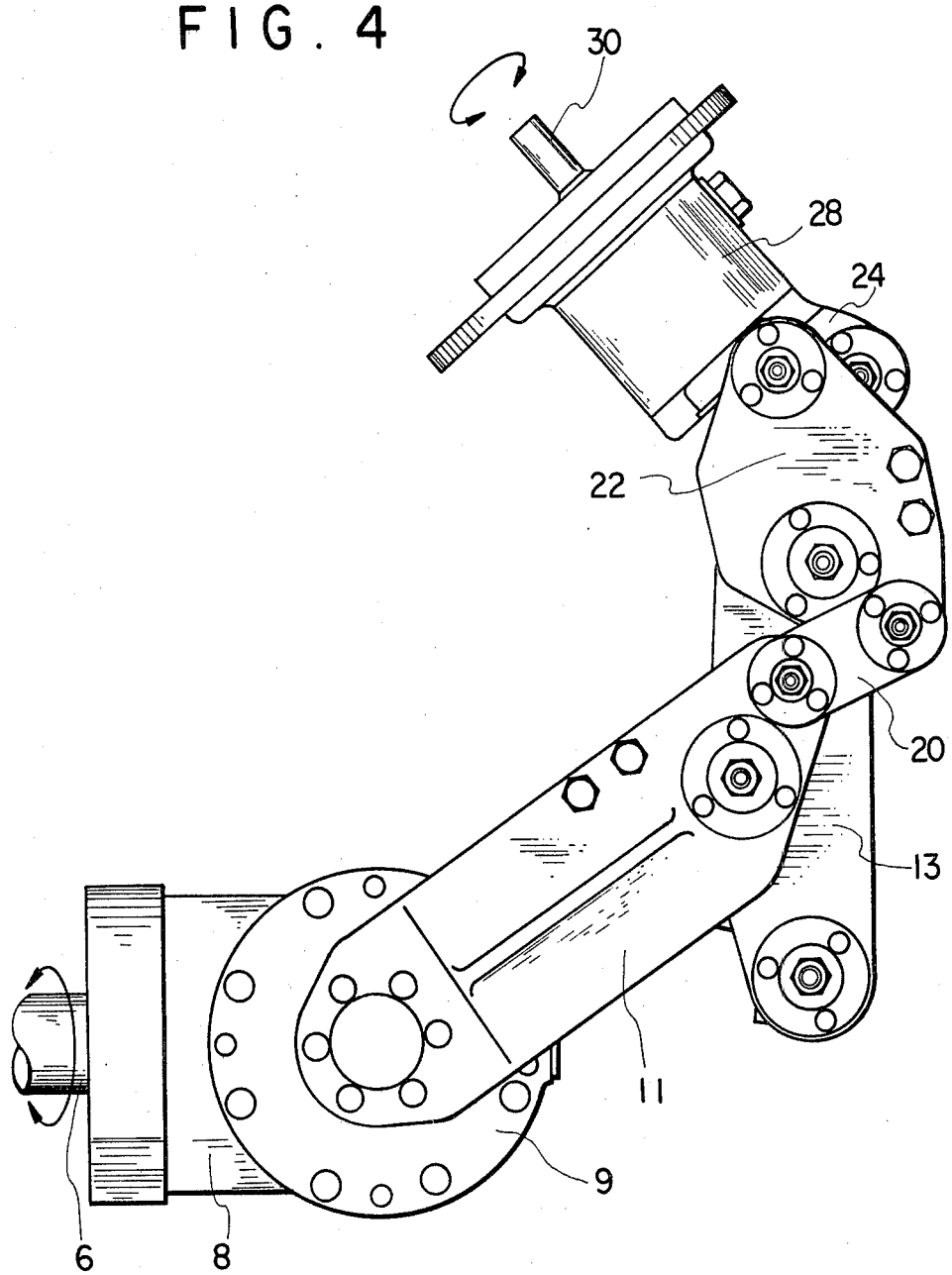
FIG. 4 is an explanatory view for the operation of the embodiment shown in FIG. 1.

While on the other hand, when the actuator 9 is actuated to rotate the arm members 11 in the direction A, the arm member 13 is rotated in the direction A around the axial center 35 and, simultaneously, the arm members 22 are rotated in the direction A around the axial center 36 to thereby rotate the arm members 24 and the casing 31 for the actuator 28 in the direction A around the axial center 37. As the result, the arm 40 is bent as shown in FIG. 4, whereby the paint spray nozzle attached to the shaft 30 is set to a predetermined position.

On the contrary, when the arm members 11 are rotated in the direction B by the actuation of the actuator 9, the arm 40 is bent in the opposite direction. In the state where the arm 40 is bent, it can also be rotated optionally around the axial line 7 by the actuation of the actuator 2. When the actuator 28 is actuated, the shaft 30 can be rotated around the axial line 32 to thereby rotate only the spray nozzle attached to the shaft 30 around the axial line 32.

By the way, since the axial centers 34 to 37 are set respectively in the arm 40 so that the distance $l_2$ is shorter than the distance $l_1$ and the distance $l_3$ is shorter than the distance $l_2$, the shafts 14, 23 and their shaft bearings can be made with members of lower mechanical strength as compared with the case where the centers for the shafts are set at an equal distance. In other words, if the arm 40 is manufactured using shafts made of those members employed for the manufacture of the arm assembly in which the centers for the shafts are set at an equal distance, the arm 40 has much more excellent rigidity and improved working life. Further, if the diameters $r_1$ to $r_3$ for the shafts 10, 15, 17 and 14 are gradually made larger from the free end at which the spray nozzle is provided to the support side at which the arm member 8 is provided, to constitute the arm 40 into a tapered configuration, the arm 40 of excellent rigidity can be obtained.

In the embodiment described above, the actuator 28 is mounted to the arm members 24, but the actuator 28 may be mounted to the arm members 22 while eliminating the arm members 24. Further, one or more additional arm members may be connected in the same manner as above to the arm members 24. Furthermore, the arm member 8 may be used as support means instead of the actuator 2. In addition, the arm for use with a manipulator according to the present invention may be applied not only for coating but also for welding. The actuators 2, 9 and 28 may be of an electric-motor type instead of the hydraulic type.

As stated above, according to the present invention, a flexible arm for use with a manipulator excellent in rigidity and with no troubles of backlash even after long use can be provided, in which the load exerted on the shaft portion at the leading end for connecting the arm members can be reduced to increase the strength of the shaft portions relatively.

What is claimed is:

1. An arm for a manipulator comprising a first arm member supported on support means, a second arm member rotatably connected at one end thereof to the first arm member, a third arm member rotatably connected to the second arm member, a fourth arm member rotatably connected to the third arm member, a first link member connected at one end thereof to the first arm member and at the other end thereof to one end of the third arm member respectively, and a second link member connected at one end thereof to the other end of the second arm member and at the other end thereof to one end of the fourth arm member respectively, the distance between the rotational center for the second arm member relative to the first arm member and the rotational center for the third arm member relative to the second arm member being greater than the distance between the rotational center for the third arm member relative to the second arm member and the rotational center for the fourth arm member relative to the third arm member.

2. The arm of claim 1, wherein the second arm member is connected by way of a first shaft to the first arm member, the second arm member and the third arm member are connected to each other by way of a second shaft, the diameter for the second shaft being smaller that the diameter for the first shaft, and the third arm member and the fourth arm member are connected to each other by way of a third shaft, the diameter for the third shaft being smaller than the diameter for the second shaft.

3. The arm of claim 2, wherein the first arm member is provided with a rotary type actuator, the first shaft being a rotational shaft of the actuator.

4. The arm of claim 3, wherein the actuator is a hydraulic type.

5. The arm of claim 1, wherein the first arm member is provided with a rotary type actuator, one end of the second arm member being connected to a rotational shaft of the actuator.

6. The arm of claim 1, wherein the second to fourth arm members comprise a pair of plate members respectively.

7. The arm of claim 1, wherein said arm further comprises a rotary actuator provided rotatably to the other end of the fourth arm member.

* * * * *